United States Patent [19]
Kurii et al.

[11] 3,941,204
[45] Mar. 2, 1976

[54] ENGINE AUTOMATIC CONTROL SYSTEM FOR VEHICLES

[75] Inventors: Masaaki Kurii; Kiyoshi Kobari, both of Kasugai; Osamu Yanagi, Tokai, all of Japan

[73] Assignees: Nippondenson Co., Ltd., Kariya; Toyota Jidosha Hanbai Kabushiki Kaisha, Nagoya; Kabushiki Kaisha Tokai Rika Denki Seisakusho, Nishikasugai, all of Japan

[22] Filed: Sept. 25, 1974

[21] Appl. No.: 509,230

[30] Foreign Application Priority Data
Oct. 8, 1973  Japan.................. 48-117928[U]

[52] U.S. Cl.......................... 180/111; 290/38 R
[51] Int. Cl.².......................... B60K 28/00
[58] Field of Search.......... 180/82 R, 101, 111, 112, 180/102; 290/38 R, 38 C, DIG. 3

[56] References Cited
UNITED STATES PATENTS

| | | | |
|---|---|---|---|
| 2,034,233 | 3/1936 | Hasselbaum | 180/111 |
| 2,876,856 | 3/1959 | Greene | 180/111 |
| 3,500,946 | 3/1970 | Boyajian | 180/111 |
| 3,731,108 | 5/1973 | Kobara | 290/38 R |

Primary Examiner—Kenneth H. Betts
Attorney, Agent, or Firm—Moonray Kojima

[57] ABSTRACT

In an engine automatic control system for a vehicle for automatically connecting an electric source with an engine starter and an ignition circuit in response to disengaging operation of a clutch device of the vehicle, for maintaining the ignition circuit conductive while the vehicle runs, and for automatically making the ignition circuit non-conductive when the vehicle is arrested, the engine control system comprises a setting circuit interposed between an ignition switch and the ignition circuit for selectively setting the engine control system to its operative condition and a cancelling switch coupled with the setting circuit for automatically cancelling the operative condition of the engine control system when an operator leaves the vehicle.

5 Claims, 1 Drawing Figure

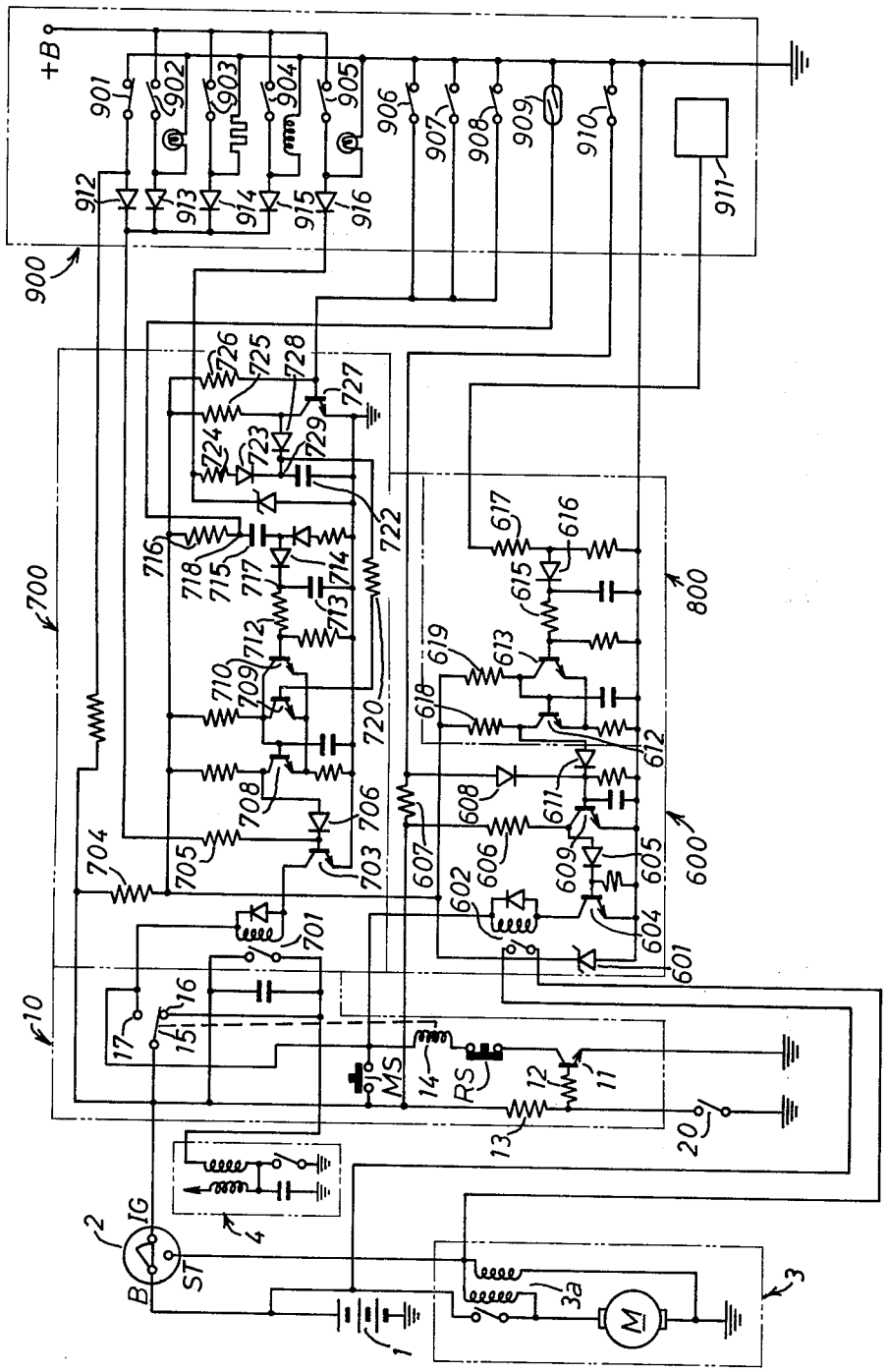

ENGINE AUTOMATIC CONTROL SYSTEM FOR VEHICLES

BACKGROUND OF THE INVENTION

The present invention relates to an automatic control system for an engine of vehicles, and more particularly to an improvement of the engine control system such as disclosed in U.S. Pat. No. 3,731,108 dated May 1, 1973, German Pat. No. 2,158,095 dated Sept. 6, 1973 and French Pat. No. 2,139,281 dated July 10, 1972.

In the engine control system disclosed in the mentioned Letters Patents, an engine is automatically stopped when the vehicle is arrested and the engine is automatically driven in response to the depression of the clutch pedal for starting the vehicle, both operations being carried out without operating the ignition switch. The installation of the engine control system to a vehicle, however, brings up a demerit to give dangers to such vehicle operators who are not aware of the installation of the control system to the vehicle.

In the case that an operator is to operate such a vehicle in which the control system is left in its ready-to-operate condition and the forward or reverse drive power train is completed, he may depress fully the clutch pedal prior to turning on the ignition switch. Consequently, due to the operation of the control system, the engine starts by full depression of the clutch pedal. Then, the operator may release the clutch pedal reflectively out of his surprise to unexpectedly run the vehicle. This unexpected running of the vehicle must be considered very dangerous as it would cause accidents of the vehicle. Furthermore, the engine of the vehicle will be stopped automatically and unexpectedly when the vehicle arrests at the crossings or the like. This unexpected engine stop would cause the operator's mental confusion to lead the operator to his misoperation of the vehicle, which is also very dangerous as accidents may easily be caused by this situation.

SUMMARY OF THE INVENTION

The prime object of the present invention is, therefore, to provide an automatic control system, wherein the function of the control system is automatically cancelled when the operator leaves the vehicle even with the ignition switch kept on, thereby to overcome the problems and dangers existing with the conventional type of engine automatic control system.

BRIEF DESCRIPTION OF THE DRAWING

The above mentioned and further objects and features of the present invention will become clearer from the following description in reference with the accompanying drawing, which depicts a preferred embodiment of an engine automatic control system in accordance with the present invention.

DESCRIPTION OF THE PREFERRED EMBODIMENT

Now referring to the drawing, described in detail is an engine automatic control system in accordance with the present invention, which includes an ignition switch 2, an ignition circuit 4 connected to the IG terminal of the ignition switch 2 and an engine starter circuit 3 having a starter relay 3a which is connected to the ST terminal of the ignition switch 2 to selectively connect a starter M with an electric source 1 in the form of a vehicle battery. The mentioned constructional portions are of well-known type and heretofore generally in use for motor-driven vehicles.

The engine automatic control system comprises an engine control circuit 700 to connect the electric source 1 with the ignition circuit 4 in response to the depression of a clutch pedal and/or an accelerator pedal of a vehicle, to maintain the ignition circuit 4 conductive while the vehicle is moving and to render the ignition circuit 4 nonconductive after the vehicle has been brought to rest. The engine control circuit 700 is connected to the electric source 1 by way of a transfer contact 15 of a self-holding relay 14 and the ignition switch 2 and by way of a voltage stabilizer having a resistor 704 and a zener diode 601 and the ignition switch 2. The engine control system further comprises a starter energizing circuit 600 to connect the electric source 1 to the engine starter M in response to the depression of the clutch pedal and a starter cut-off circuit 800 to cut off current supply to the starter M in response to the start of engine rotation caused by the starter M. The starter energizing circuit 600 is connected to the electric source 1 by way of the transfer contact 15 of the relay 14 and the ignition switch 2 and by way of the voltage stabilizer and the ignition switch 2. The starter cut-off circuit 800 is connected to the electric source 1 by way of the voltage stabilizer and the ignition switch 2.

Within a self-holding circuit 10 having the self-holding relay 14, the transfer contact 15 normally engages with an input terminal 16 of the ignition circuit 4 and the coil of the relay 14 is connected at its one end to the electric source 1 through a manual set switch MS of a push button type and the ignition switch 2 and to an input terminal 17 for the engine control circuit 700, the starter energizing circuit 600 and the starter cut-off circuit 800. The coil of the relay 14 is further connected at its other end to the collector of a transistor 11 through a manual release switch RS of a normally closed type. The transistor 11 is connected at its base to the electric source 1 through resistors 12 and 13 and the ignition switch 2 and grounded at its emitter. The base of the transistor 11 is also grounded across the resistor 12 and an automatic release switch 20 of a normally open type. The automatic release switch 20 is such a normally open as provided in the vehicle door to be closed by opening of the door or in the operator's seat to be closed when the operator leaves his seat. While the automatic release switch 20 is normally opened with the ignition switch 2 in its operative condition, the transistor 11 is conditioned to its conductive state by bias voltage appearing at its base. Thus, when the manual set switch MS is pushed, the relay 14 is energized under the conduction of the transistor 11 to engage the transfer contact 15 with the input terminal 17. After the release of the manual set switch MS, the energization of the relay 14 is maintained by the engagement of the transfer contact 15 with the input terminal 17. This completes preparation of the operation of the automatic control system. Under this condition, when the operator leaves the vehicle with the ignition switch 2 in its operative condition, the conduction of the transistor 11 is cancelled by closure of the automatic release switch 20. This deenergizes the relay 14 and the transfer contact 15 returns to its original position, thereby to cancel the function of the automatic control system.

The engine control circuit 700 is provided with an ignition relay 701 having a normally open contact interposed between the ignition switch 2 and the ignition circuit 4. The coil of the relay 701 is connected at its one end to the electric source 1 through the transfer contact 15 of the relay 14 and the ignition switch 2 and connected at its other end to the collector of a transistor 703. The transistor 703 is connected at its base to a common output terminal of a first and a second conventional Schmitt circuits substantially including transistors 708, 709 and 710 through a diode 706. This base of the transistor 703 is further connected to a thermosenser 901, a lighting switch 902, a defogger switch 903 and an air-conditioner switch 904 through a resistor 705 and diodes 912, 913, 914 and 915 respectively, the senser 901 and all the switches 902, 903 and 904 being provided within a detecting circuit 900.

The thermosenser 901 is a normally closed switch grounded at one end thereof to interrupt current supply to the base of the transistor 703 from the electric source 1 by way of the resistor 705 and the diode 912. Thus, the thermosenser 901 is opened to cause the conduction of the transistor 703 when the temperature of the engine cooling water becomes over a predetermined high value to cause the overheat of the engine or under a predetermined low value to stop the engine. The lighting switch 902 is a normally open switch connected at its one end to the terminal +B of the electric source 1 to maintain the conduction of the transistor 703 while head lamps of the vehicle are lit. The defogger switch 903 in the form of a normally open switch connects the terminal +B of the electric source 1 to the base of the transistor 703 across the diode 914 and the resistor 705 to energize the relay 701 under energization of a heater element provided within the rear window shield of the vehicle. The air-conditioner switch 904 is a normally open switch connected at one end thereof to the terminal + B of the electric source 1 to maintain the conduction of the transistor 703 while the air-conditioner of the vehicle is driven.

The transistor 710 of the second Schmitt circuit is connected at its base by way of a resistor 712 to an output of a D-A converter including condensers 713 and 715, a diode 714 and a resistor 716. The condenser 715 is connected at its one end to a speed senser 909 of the detecting circuit 900 and connected at its other end to the anode of the diode 714 so as to block current supply to the base of the transistor 710 from the electric source 1 through the resistors 716 and 704 and the ignition switch 2. The speed senser 909 is coupled to a permanent magnet provided on a rotating portion of the vehicle power train. The condenser 713 is connected to the junction 717 between the resistor 712 and the diode 714 at one end thereof and grounded at its other end to convert pulse signals exerted thereon from the speed senser 909 into analog signals. Further, the resistor 712 and the condenser 713 form a time-constant circuit to maintain the energization of the relay 701 by means of the function of the second Schmitt circuit in a predetermined period of time after the vehicle is arrested.

The engine control circuit 700 further comprises a transistor 727 which is connected at its collector to the base of the transistor 709 of the first Schmitt circuit through a diode 728 and a resistor 720 and to the electric source 1 by way of a resistor 725 and the resistor 704. The collector of the transistor 727 is further connected through the diode 728 to a condenser 722 which is grounded at one end thereof. The condenser 722 is charged by the electric source 1 through the diode 728 and the resistors 725 and 704 under the non-conductive state of the transistor 727. In this case, the condenser 722 and the resistor 720 form a time-constant circuit to maintain the energization of the relay 701 by means of the function of the first schmitt circuit in a predetermined period of time after the vehicle is arrested. To a junction 729 between the condenser 722 and the diode 728, connected is a turn signal switch 905 of a normally open type at its one end through the diode 916, a resistor 724 and a diode 723, the other end of the switch 905 being connected to the terminal +B of the electric source 1 to maintain the conduction of the transistor 703 by means of the operation of the first Schmitt circuit while a conventional flasher device of the vehicle is activated. The base of the transistor 727 is connected to the electric source 1 through a resistor 726 and the resistor 704 and in series with an accelerator switch 906 which is connected in parallel with a first clutch switch 907 and a slope senser 908. The switches 906 and 907 and the slope senser 908 are normally opened and grounded at one end thereof respectively. The first clutch switch 907 is designed to be closed by the clutch pedal when a frictional clutch engagement mechanism is conditioned to its half engagement.

The starter energizing circuit 600 comprises a starter relay 602 having a normally open contact interposed between the starter circuit 3 and the electric source 1. The coil of the relay 602 is connected at its one end to the electric source 1 through the transfer contact 15 and the ignition switch 2 and connected at its other end to the collector of a transistor 604 to be energized by the conduction of the transistor 604. The transistor 604 is connected at its base to the electric source 1 through a diode 605, a resistor 606 and the ignition switch 2 and further connected to the collector of a transistor 609 through the diode 605. The transistor 609 is connected at its base to the electric source 1 through a diode 608, a resistor 607 and the ignition switch 2 and to a second clutch switch 910 of the detecting circuit 900 through the diode 608. The second clutch switch 910 is designed to be closed by the clutch pedal when the frictional clutch engagement mechanism is conditioned to its full disengagement. Thus, the second clutch switch 910 acts to cause the non-conduction of the transistor 609 by its closure so as to activate the engine starter M by means of the energization of the transistor 604 and the relay 602 during the full disengagement of the clutch mechanism.

The starter cut-off circuit 800 includes a third Schmitt circuit which comprises transistors 612 and 613. The transistor 612 is connected at its collector to the base of the transistor 609 through a diode 611 and to the electric source 1 through a resistor 618, the resistor 704 and the ignition switch 2. The transistor 613 is connected at its collector to the electric source 1 through a resistor 619, the resistor 704 and the ignition switch 2 and further connected at its base to an alternator 911 driven by the vehicle engine by way of resistors 615 and 617 and a diode 616.

The operation of the system of the present invention as described above is well explained hereinafter. While the vehicle is arrested with both of the ignition and manual set switches 2 and MS turned on, that is, the B terminal is in connection with the IG terminal within the ignition switch 2 to make the transistor 11 conductive, the self-holding relay 14 is energized to connect the electric source 1 to the engine control system by way of the transfer contact 15. In this condition, depression of the clutch pedal closes the first clutch switch 907 to ground the base of the transistor 727 and sequentially closes the second clutch switch 910 to make the transistor 609 non-conductive. The transistor 727 becomes non-conductive to cause the charge of the condenser 722 by the electric source 1 through the diodes 728 and the resistors 725 and 704 and to make the transistor 703 conductive by means of the invertion of the first Schmitt circuit activated by the charged voltage of the condenser 722 in a short period of time. This causes the energization of the ignition relay 701 to connect the electric source 1 to the ignition circuit 4 through the relay 701. Simultaneously, the non-conduction of the transistor 609 causes the conduction of the transistor 604 to energize the starter relay 602 so as to operate the starter M. Then, the starter M drives the engine of the vehicle. As the engine rotates, a voltage of about 7 volts appears within the alternator 911 and the third Schmitt circuit operates to make the transistor 609 conductive and to make the transistor 604 non-conductive. Thus, the starter relay 602 is deenergized by the non-conduction of the transistor 604 to cut off current supply to the starter M.

In starting the vehicle, the accelerator pedal is gradually depressed to close the accelerator switch 906 and the clutch pedal is gradually released to open the first and second clutch switches 907 and 910. In this instance, the transistor 727 kept non-conductive maintains the charge of the condenser 722 to keep the ignition relay 701 operative. When the vehicle runs, even if the transistor 727 is turned to be conductive by opening of the accelerator switch 906, the current supply to the ignition circuit 4 given by the energization of the ignition relay 701 is maintained by the output of the D-A converter including the condenser 713 driven by the speed signals from the speed senser 909.

When the vehicle is arrested on a flat ground, the accelerator pedal being released and the clutch and brake pedals being actuated, the slope senser 908 is kept open and the first clutch switch 907 is closed to make the transistor 727 non-conductive. This maintains current supply to the ignition circuit 4 by means of the energization of the ignition relay 701 which is caused by the operation of the first Schmitt circuit connected to the electric source 1 by way of the resistors 720, 725 and 704 and the diode 728. At the same time, current supply to the starter M is blocked by the deenergization of the starter relay 602 which is caused by the operation of the third Schmitt circuit applied the alternator voltage therein regardless of the closure of the second clutch switch 910. In this condition, when the clutch pedal is released to open the first and second clutch switch 907 and 910, the transmission of the vehicle being conditioned to its neutral state, the transistor 727 is turned to be conductive and the ignition relay 701 is deenergized after the predetermined period of time defined by the time constant of the resistor 720 and the condenser 722. Consequently, the current supply to the ignition circuit 4 is blocked to automatically stop the engine rotation.

In the case that the vehicle is arrested on a slant ground, on a slope etc., the slope senser 908 is closed to keep the non-conduction of the transistor 727 regardlessly of the on-off condition of the first clutch switch 907. Thus, the current supply to the ignition circuit 4 is maintained by means of the energization of the ignition relay 701 which is caused by the operation of the first Schmitt circuit connected to the electric source 1 by way of the resistors 720, 725 and 704 and the diode 728. As the result, the engine keeps running to prevent the vehicle from moving back on the slope when the vehicle starts running.

In the case the temperature of engine cooling water stays higher than the predetermined high value or lower than the predetermined low value during the arresting of the vehicle the thermosenser 901 becomes off to directly cause the conduction of the transistor 703 due to the current supply applied from the electric source 1 through the resistor 705 and the diode 912. Then, the ignition relay 701 maintains its energization to keep the current supply to the ignition circuit 4 independently of the operation of the first clutch switch 907.

In turning the vehicle, the turn signal switch 905 is closed in response to the actuation of the flasher device of the vehicle to directly connect the terminal +B of the electric source 1 to the base of the transistor 709 of the first Schmitt circuit through the resistors 720 and 724 and the diodes 723 and 916 independently of the operation of the first clutch switch 907. This operates the first Schmitt circuit to keep the energization of the ignition relay 701 by way of the conduction of the transistor 703, and the current supply to the ignition circuit 4 is maintained to keep the engine rotation. This means that instantly starting the vehicle soon after the stop is possible since the engine does not stop and the rotation of the engine can smoothly be accelerated.

In the case the electric energy of the electric source 1 is supplied to electric accessories such as head lamps, heater elements, an air-conditioner and the like, the lighting switch 902, the defogger switch 903 or the air-conditioner switch 904 is closed in response to energizing of the above electric accessories to directly connect the terminal +B of the electric source 1 to the base of the transistor 703 through the resistor 705. The conduction of the transistor 703 maintains the energization of the ignition relay 701 to keep the current supply of the ignition circuit 4. This condition can be realized independently of the operation of the first clutch switch 907.

Described in detail are the function of the self-holding circuit 10 and the function of the automatic release switch 20 coupled with the self-holding circuit 10 to cancel the ready-to-operate condition of the engine automatic control system.

When the ignition switch 2 is turned on, the electric current from the electric source 1 is supplied to the base of the transistor 11 of the self-holding circuit 10 and the transistor 11 is conditioned to its conductive state while the automatic release switch 20 is opened. Turning on the manual switch MS energizes the self-holding relay 14 to shift the transfer contact 15 to the input terminal 17. Thus, the control system is connected to the electric source 1 and ready to operate.

When the vehicle is arrested with the automatic control system in its operative condition, the engine automatically stops. Under this condition, if the operator leaves the vehicle with the ignition switch 2 in its operative condition, the automatic release switch 20 is closed to block the base current of the transistor 11 so as to cause the non-conduction of the transistor 11. Thus, the transfer contact 15 is subsequently returned to its original position and the function of the automatic control system is cancelled. This automatic cancellation prevents another operator who does not know the installation of the automatic control system of the vehicle from dangers caused by unexpected start of the vehicle by depression of the clutch pedal. He is also protected against dangers caused by his mental confusion when the engine of the vehicle unexpectedly stops upon arresting the vehicle at the crossing and the like.

Moreover, optional use of the manual release switch RS by the operator blocks current supply to the transistor 11 and the relay 14 is deenergized. Thus, the transfer contact 15 returns to its original position to cancel the function of the automatic control system.

Having thus described the preferred embodiment of the invention it should be understood that numerous structural modifications and adaptations may be resorted to without departing from the spirit of the invention.

What is claimed is:

1. In an engine automatic control system for a vehicle having an ignition switch for selectively connecting an electric source with an engine starter and an engine ignition circuit comprising switch means to be closed by disengaging operation of clutch means of the vehicle, a starter energizing circuit for connecting said electric source with said starter in response to the closing operation of said switch means, a starter cut-off circuit for detecting the start of engine rotation caused by said starter and cutting off current supply to said starter, speed sensing means for detecting the speed of the vehicle, and an engine control circuit controlled by said speed sensing means for maintaining said engine ignition circuit conductive while the vehicle runs and for making said ignition circuit non-conductive when the vehicle is arrested, the improvement comprising setting means interposed between said ignition switch and said ignition circuit for selectively disconnecting said ignition circuit from said ignition switch and setting said engine control system to its operative condition and cancelling means coupled with said setting means for automatically cancelling the operative condition of said engine control system when an operator leaves the vehicle.

2. An engine automatic control system as claimed in claim 1, wherein said setting means is a self-holding circuit connected with said electric source through said ignition switch and provided therein with a self-holding relay to be energized under the operative condition of said ignition switch, the energization of said self-holding relay connecting said electric source with said engine control system and said cancelling means is a release switch coupled with said self-holding circuit for automatically deenergizing said self-holding relay when an operator leaves the vehicle.

3. An engine automatic control system as claimed in claim 2, wherein said release switch is a normally open switch provided in a vehicle door structure to be closed by opening of said vehicle door.

4. An engine automatic control system as claimed in claim 2, wherein said release switch is a normally open switch provided in the operator's seat to be closed when the operator leaves his seat.

5. An engine automatic control system as claimed in claim 2, wherein said self-holding circuit comprises a transistor to be energized by bias voltage applied from said electric source when said ignition switch is turned on, said self-holding relay being coupled with said transistor, and a manual set switch of a normally open type to be selectively closed under the conduction of said transistor to energize said relay and said automatic release switch is coupled with the base of said transistor to deenergize said transistor when an operator leaves the vehicle.

* * * * *